US010007930B2

(12) United States Patent
Hamilton, II et al.

(10) Patent No.: US 10,007,930 B2
(45) Date of Patent: Jun. 26, 2018

(54) INVOCATION OF ADVERTISEMENTS IN A VIRTUAL UNIVERSE (VU)

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2457 days.

(21) Appl. No.: 11/679,602

(22) Filed: Feb. 27, 2007

(65) Prior Publication Data
US 2008/0208684 A1 Aug. 28, 2008

(51) Int. Cl.
G06Q 30/02 (2012.01)

(52) U.S. Cl.
CPC ......... *G06Q 30/0264* (2013.01); *G06Q 30/02* (2013.01); *G06Q 30/0277* (2013.01)

(58) Field of Classification Search
CPC .................................................. G06Q 30/0264
USPC .......................................................... 705/14
See application file for complete search history.

(56) References Cited

U.S. PATENT DOCUMENTS

| | | |
|---|---|---|
| 5,964,660 A | 10/1999 | James et al. |
| 6,023,270 A | 2/2000 | Brush et al. |
| 6,036,601 A | 3/2000 | Heckel |
| 6,119,101 A | 9/2000 | Peckover |
| 6,119,229 A * | 9/2000 | Martinez et al. ............... 726/28 |
| 6,271,843 B1 | 8/2001 | Lection et al. |
| 6,954,728 B1 | 10/2005 | Kusumoto et al. |
| 6,968,315 B1 | 11/2005 | Nakisa |
| 6,981,220 B2 | 12/2005 | Matsuda |
| 6,988,127 B2 | 1/2006 | Matsuda et al. |
| 7,139,796 B2 | 11/2006 | Rekimoto et al. |
| 2001/0018667 A1 | 8/2001 | Kim |
| 2002/0093538 A1 | 7/2002 | Carlin |
| 2002/0094189 A1 | 7/2002 | Navab et al. |
| 2003/0014423 A1* | 1/2003 | Chuah et al. ................. 707/102 |

(Continued)

OTHER PUBLICATIONS

Richard Siklos, "A Virtual World but Real Money", Article Tools Sponsored by Dench Blanchett, Notes on Scandal, Published: Oct. 19, 2006.

(Continued)

*Primary Examiner* — Daniel M Sorkowitz
(74) *Attorney, Agent, or Firm* — Lisa Ulrich; Hoffman Warnick LLC

(57) ABSTRACT

The present invention provides an approach to invoke advertisement(s) in a VU. Specifically, an advertisement is virtually associated with a user of the virtual space. The advertisement will then be visually referenced in the VU, and optionally distinguished/highlighted (e.g., using visual effects such as colors, icons, flashing icons, etc.). The advertisement will be invoked in response to a trigger occurring in the VU user in the). Once invoked, an action associated with the advertisement will be executed. The present invention can also allow for advertising user to be compensated for allowing their asset(s) to be associated with advertisement(s). Such compensation can be in the form of credits associated with the VU being provided to the advertising user and/or compensation to be provided to the user outside of the VU (e.g., in the real world in the form of money, gift certificates, goods and/or services, etc.).

24 Claims, 4 Drawing Sheets

(56) References Cited

U.S. PATENT DOCUMENTS

| | | | |
|---|---|---|---|
| 2004/0248649 | A1 | 12/2004 | Arai et al. |
| 2005/0037846 | A1 | 2/2005 | Anokhin |
| 2005/0216346 | A1* | 9/2005 | Kusumoto et al. ............. 705/14 |
| 2006/0130095 | A1 | 6/2006 | Wiliis et al. |
| 2006/0135232 | A1 | 6/2006 | Willis |
| 2006/0155597 | A1 | 7/2006 | Gleason |
| 2006/0229976 | A1 | 10/2006 | Jung et al. |
| 2007/0038559 | A1 | 2/2007 | Jung et al. |
| 2007/0179867 | A1* | 8/2007 | Glazer et al. ................... 705/27 |
| 2007/0218987 | A1* | 9/2007 | Van Luchene .......... A63F 13/10 463/30 |
| 2007/0265090 | A1* | 11/2007 | Barsness ................ A63F 13/12 463/42 |
| 2008/0189175 | A1* | 8/2008 | Chan .............................. 705/14 |

OTHER PUBLICATIONS

Jeremy Lockhorn, "Virtual Advertising in a Virtual World", Email-Labs, High-Performance Email Marketing Technology, Jun. 19, 2006, pp. 1-2, http://www.clickz.com/showPage.html?page=clickz_print&id=3613746.

Betsy Book, "These bodies are Free, so get one Now!: Advertising and Branding in Social Virtual Worlds," 2004, 3 pages, Social Science Research Network.

Wikipedia Encyclopedia, "Universally Unique Identifier," 2007, 3 pages.

* cited by examiner

| ACTION UUID | ACTION TYPE | ACTION INFO. | ACTION DISPLAY | ACTION NEXT UUID | ACTION NEXT TIMING |
|---|---|---|---|---|---|
| AC1 | AT1 | AI1 | ADSP1 | AN1 | ANT1 |
| AC2 | AT2 | AI2 | ADSP2 | AN2 | ANT2 |
| AC3 | A33 | AI3 | ADSP3 | AN3 | ANT3 |

FIG. 4

INVOCATION OF ADVERTISEMENTS IN A VIRTUAL UNIVERSE (VU)

FIELD OF THE INVENTION

The present invention generally relates to virtual universes (VUs). Specifically, the present invention relates to the invocation of advertisement(s) in a VU.

BACKGROUND OF THE INVENTION

Virtual universes (VUs) are rapidly becoming a popular part of today's culture. In general, a VU is a digital world such as Second Life (Second Life is a trademark of Linden Research, Inc. in the United States and/or other countries), characterized by user(s) controlling avatar(s) representing the user(s) as they interact with each other and the environment within the VU. An avatar is a graphical representation the user selects that others can see, often taking the form of a cartoon-like human or other figure. An agent is the user's account, upon which the user can build an avatar, and which is tied to the inventory of assets the user owns. A region is a virtual area of land within the VU, typically residing on a server's CPU. Assets, avatar(s), the environment, and anything visual comprise universally unique identifiers (UUIDs) (tied to geometric data distributed to user(s) as textual coordinates), textures (distributed to user(s) as graphics files), and effects data (rendered by the user's client according to the user's preference(s) and user's device capabilities).

Second Life and other on-line virtual environments present a tremendous new outlet for both structured and unstructured virtual collaboration, gaming and exploration, as well as real-life simulations in virtual spaces. These activities, along with yet to be disclosed new dimensions, in turn provide a wide open arena for creative and new advertising methods and mechanisms. Currently, an agent's inventory is disconnected from the user's real world interests and desires. As such, there is no existing approach that allows advertisers and the like to fully leverage the information and client base of the VUs. In view of the foregoing, there exists a need for a solution that solves such problems.

SUMMARY OF THE INVENTION

In general, the present invention provides an approach to invoke advertisement(s) in a VU. Specifically, under the present invention, an advertisement is virtually associated with a user (e.g., also referred to herein as an "advertising user") of the virtual space. Such association can be with the user's avatar, an asset in an inventory of the user, etc. Regardless, the advertisement will then be visually referenced in the VU (with the advertisement itself or a corresponding object) and optionally distinguished/highlighted (e.g., using visual effects such as colors, icons, flashing icons, etc.). The advertisement will be invoked in response to a trigger occurring in the VU (e.g., based on the actions of another user in the VU who is referred to herein as a "triggering user"). Once invoked, an action associated with the advertisement will be executed. The present invention can also allow for advertising user(s) to be compensated for allowing themselves to be virtually associated with advertisement(s). Such compensation can be in the form of credits associated with the VU being provided to the advertising user(s) and/or a compensation to be provided to the advertising user(s) outside of the VU (e.g., in the real world in the form of money, gift certificates, goods and/or services, etc.).

A first aspect of the present invention provides a method for invoking advertisements in a virtual universe (VU), comprising: virtually associating an advertisement with a user of the virtual space; referencing the advertisement visually in the VU; invoking the advertisement in response to a trigger occurring in the VU; and executing an action associated with the advertisement in the VU in response to the advertisement being invoked.

A second aspect of the present invention provides a system for invoking advertisements in a virtual universe (VU), comprising: a module for virtually associating an advertisement with a user of the virtual space; a module for referencing the advertisement visually in the VU; a module for invoking the advertisement in response to a trigger occurring in the VU; and a module for executing an action associated with the advertisement in the VU in response to the advertisement being invoked.

A third aspect of the present invention provides a program product stored on a computer readable medium for invoking advertisements in a virtual universe (VU), the computer readable medium comprising program code for causing a computer to: virtually associate an advertisement with a user of the virtual space; reference the advertisement visually in the VU; invoke the advertisement in response to a trigger occurring in the VU; and execute an action associated with the advertisement in the VU in response to the advertisement being invoked.

A fourth aspect of the present invention provides a method for deploying a system for invoking advertisements in a virtual universe (VU), comprising: providing a computer infrastructure being operable to: virtually associate an advertisement with a user of the virtual space; reference the advertisement visually in the VU; invoke the advertisement in response to a trigger occurring in the VU; and execute an action associated with the advertisement in the VU in response to the advertisement being invoked.

A fifth aspect of the present invention provides computer software embodied in a propagated signal for invoking advertisements in a virtual universe (VU), the computer software comprising instructions for causing a computer to: virtually associate an advertisement with a user of the virtual space; reference the advertisement visually in the VU; invoke the advertisement in response to a trigger occurring in the VU; and execute an action associated with the advertisement in the VU in response to the advertisement being invoked.

A sixth aspect of the present invention provides a data processing system for invoking advertisements in a virtual universe (VU), comprising: a memory medium having instructions; a bus coupled to the memory medium; and a processor coupled to the bus, that when executing the instructions, cause the data processing system to virtually associate an advertisement with a user of the virtual space; reference the advertisement visually in the VU; invoke the advertisement in response to a trigger occurring in the VU; and execute an action associated with the advertisement in the VU in response to the advertisement being invoked.

A seventh aspect of the present invention provides a computer-implemented business method for invoking advertisements in a virtual universe (VU), comprising: virtually associating an advertisement with a user of the virtual space; referencing the advertisement visually in the VU; invoking the advertisement in the VU in response to a trigger occurring in the VU; and executing an action associated with the advertisement in the VU in response to the invoking.

Each of these aspects can also include at least one of the following additional aspects (in no particular order):

The action being executed in accordance with a set of instructions associated with the advertisement in a first table associated with the VU;

The first table comprising: a first field containing a foreign key universally unique identifier (UUID) for an object that contains geometric information, textures, information tags and any scripts for the advertisement; a second field containing an advertisement UUID for the advertisement, the advertisement being an invisible asset, and an asset with which the advertisement is associated being a visible asset; and a third field containing a foreign key action UUID for an action record associated with the action.

A second table being provided that comprises: a first field containing an action UUID that comprises a unique key for the action; a second field containing an action type for the action; a third field containing action information for the action; a fourth field containing an action display for the action; a fifth field containing an action next UUID to allow for multiple actions; and a sixth field containing an action next timing for the action.

The action type comprising at least one of the following: launching a uniform resource locator (URL), displaying text information, playing a multimedia object, executing a script, setting a timing specification for a delay, and performing a transaction.

The action information comprising at least one of the following: the URL, the text information, a pointer to the multimedia object, the script, the timing specification, and the transaction data; the action display comprises at least one of the following: a link description and a pointer to an icon object; the action next timing sets forth a time to execute an additional action with response to the executing of the action; the advertisement being visually referenced and optionally highlighted in the VU; the visual reference being distinguished with at least one of the following: distinguishing the asset with at least one of the following: a symbol, a glow, a textual display, and an audio queue.

The trigger comprising at least one of the following: a triggering user clicking on the advertisement with a pointing device, the triggering user hovering over the advertisement with the pointing device, the triggering user text chatting to the user, the triggering user giving a voice command to invoke the advertisement, and the triggering user triggering a condition.

The condition comprising a presence of an avatar of the triggering user near the visual representation of the advertisement within the VU causing automatic invocation of the advertisement a predetermined quantity of times separated by at least one predetermined time interval.

The user being compensated in at least one of the following ways: providing credits associated with the VU to the user, and providing a reward to the user outside of the VU.

BRIEF DESCRIPTION OF THE DRAWINGS

These and other features of this invention will be more readily understood from the following detailed description of the various aspects of the invention taken in conjunction with the accompanying drawings in which:

FIG. 4 depicts a second illustrative table according to the present invention.

Figure 1:
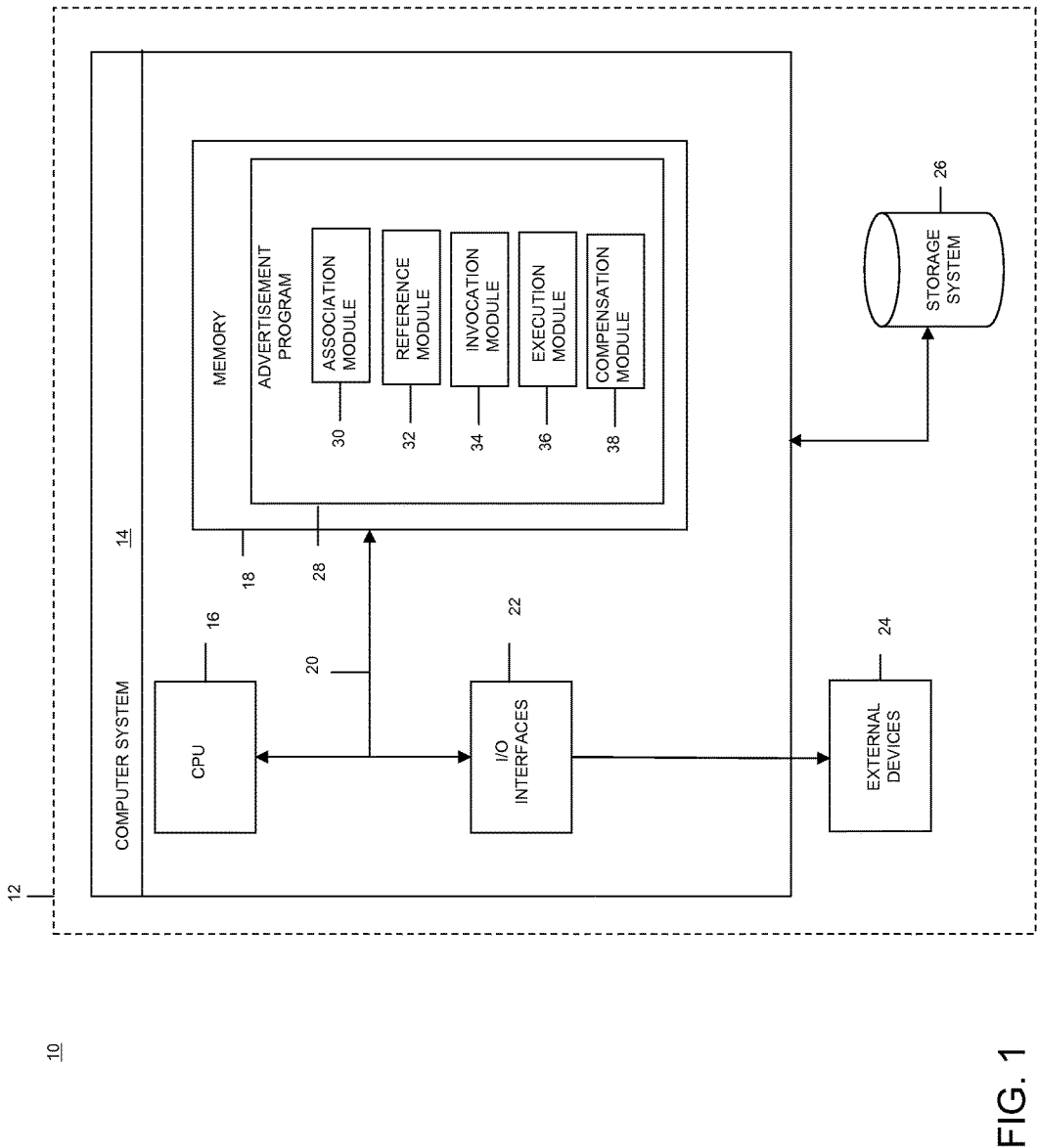
FIG. 1 depicts an illustrative computer system for implementing the teachings of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides an approach to invoke advertisement(s) in a VU. Specifically, under the present invention, an advertisement is virtually associated with a user (e.g., also referred to herein as an "advertising user") of the virtual space. Such association can be with the user's avatar, an asset in an inventory of the user, etc. Regardless, the advertisement will then be visually referenced in the VU (with the advertisement itself or a corresponding object) and optionally distinguished/highlighted (e.g., using visual effects such as colors, icons, flashing icons, etc.). The advertisement will be invoked in response to a trigger occurring in the VU (e.g., based on the actions of another user in the VU who is referred to herein as a "triggering user"). Once invoked, an action associated with the advertisement will be executed. The present invention can also allow for advertising user(s) to be compensated for allowing themselves to be virtually associated with advertisement(s). Such compensation can be in the form of credits associated with the VU being provided to the advertising user(s) and/or a compensation to be provided to the advertising user(s) outside of the VU (e.g., in the real world in the form of money, gift certificates, goods and/or services, etc.).

Along these lines, the advertising user(s) of a VU can be compensated (e.g., per click) to serve as walking advertisement(s). In one illustrative scenario, an avatar for the advertising user could wear a garment in the VU with a logo or the like. As such, if another user clicks on the garment, they can be linked, either through teleportation in the VU space or invocation in legacy web browser space, to products, services, or special offers. Alternatively, clicking on the garment could download promotional material to the avatar inventory of the triggering user. In a more subtle scenario, such a logo could be implicit and require an action to unveil (e.g., through a right click and "show sponsor" action). One element of this invention is that the advertising user(s) can choose advertisement(s) that reflect their own tastes and values. This approach combines the best of viral marketing with known pay-per-click methods, and rolls it out in a totally new forum.

Figure 2:
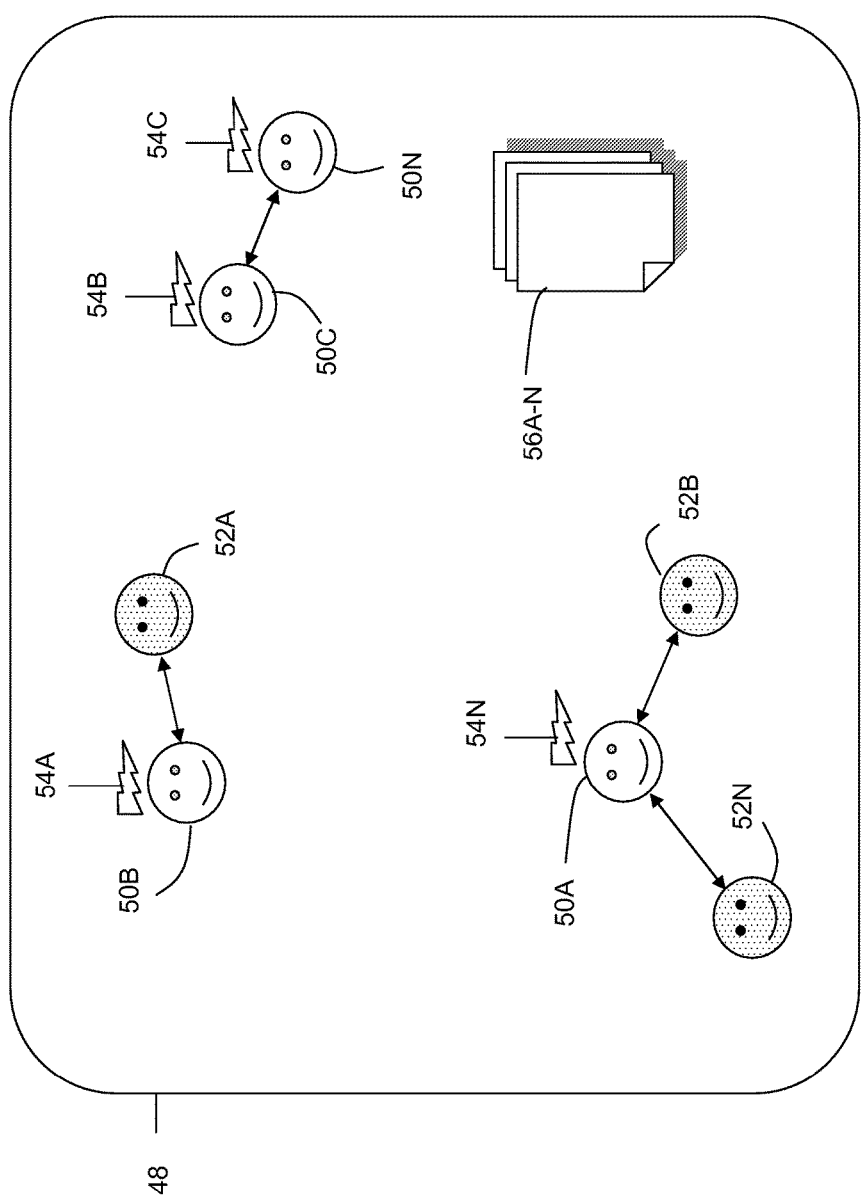
FIG. 2 depicts an illustrative virtual environment according to the present invention.

These concepts will be explained in greater detail with respect to FIGS. 1 and 2 collectively. Specifically, FIG. 1 shows a computerized implementation 10 of the present invention to be further described below, while FIG. 2 shows an illustrative VU 48 having advertising avatar(s) 50A-N (corresponding to advertising user(s)), and triggering avatar(s) 52A-N (corresponding to triggering avatar(s)). As mentioned above, avatar(s) 50A-N and 52A-N are graphical representations of user(s) that have characteristics (physical and otherwise) based on selections and/or designations made in the user(s)' accounts. Avatar(s) 50A-N and 52C-D navigate about VU 48 and interact with each other, and the environment of VU 48. Advertisement reference(s) 54A-N comprise visual reference(s) to advertisement(s) 56A-N with which users have agreed to be associated.

As depicted in FIG. 1, implementation 10 includes computer system 14 deployed within a computer infrastructure 12. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 12 is intended to demonstrate that some or all of the components of implementation 10 could be deployed, managed, serviced, etc. by a service provider who offers to implement, deploy, and/or perform the functions of the present invention for others. As such, an advertiser, a provider of VU 48, or another third party could implement any component shown in FIG. 1. In any event, advertisement program 28 could work in conjunction with any program(s) used to provide and/or manage VU 48.

As shown, computer system 14 includes a processing unit 16, a memory 18, a bus 20, and input/output (I/O) interfaces 22. Further, computer system 14 is shown in communication with external I/O devices/resources 24 and storage system 26. In general, processing unit 16 executes computer program code, such as advertisement program 28, which is stored in memory 18 and/or storage system 26. While executing computer program code, processing unit 16 can read and/or write data to/from memory 18, storage system 26, and/or I/O interfaces 22. Bus 20 provides a communication link between each of the components in computer system 14. External devices 24 can comprise any devices (e.g., keyboard, pointing device, display, etc.) that enable a user to interact with computer system 14 and/or any devices (e.g., network card, modem, etc.) that enable computer system 14 to communicate with one or more other computing devices.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the process(es) of the invention. Moreover, computer system 14 is only representative of various possible computer systems that can include numerous combinations of hardware. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 16 may comprise a single processing unit, or be distributed across one or more processing units in one or more locations, e.g., on a client and server. Similarly, memory 18 and/or storage system 26 can comprise any combination of various types of data storage and/or transmission media that reside at one or more physical locations.

Further, I/O interfaces 22 can comprise any system for exchanging information with one or more external device 24. Still further, it is understood that one or more additional components (e.g., system software, math co-processing unit, etc.) not shown in FIG. 1 can be included in computer system 14. However, if computer system 14 comprises a handheld device or the like, it is understood that one or more external devices 24 (e.g., a display) and/or storage system 26 could be contained within computer system 14, not externally as shown.

Storage system 26 can be any type of system (e.g., a database) capable of providing storage for information under the present invention. To this extent, storage system 26 could include one or more storage devices, such as a magnetic disk drive or an optical disk drive. In another embodiment, storage system 26 includes data distributed across, for example, a local area network (LAN), wide area network (WAN) or a storage area network (SAN) (not shown). In addition, although not shown, additional components, such as cache memory, communication systems, system software, etc., may be incorporated into computer system 14.

Shown in memory 18 of computer system 14 is advertisement program 28, which facilitates the functions as described herein. As depicted, advertisement program 28 includes association module 30, reference module 32, invocation module 34, execution module 36, and compensation module 38. It should be understood that this configuration of functionality is intended to be illustrative only, and that identical or similar functionality could be provided with a different configuration of systems.

In a typical embodiment, advertisement program 28 will work in conjunction with a VU program (not shown) that is used to render and manage VU 48. In the event that the program for rendering the VU and advertisement program 28 are both provided by a common party/entity (e.g., a "VU provider"), it should be understood that advertisement program 28 can be incorporated within the VU program, or it could exist separately.

Figure 3:
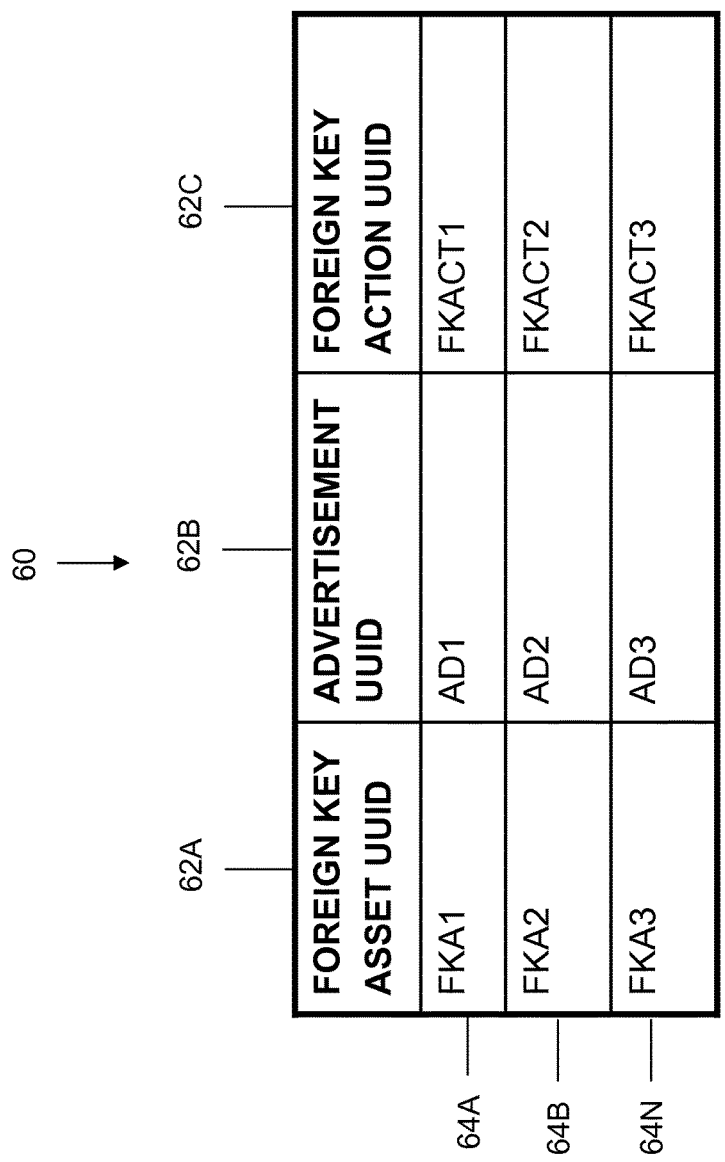
FIG. 3 depicts a first illustrative table according to the present invention.

Regardless, association module 30 will first virtually associate advertisement(s) 56A-N with the advertising user(s) (corresponding to advertising avatar(s) 50A-N). As such, association module 30 will create and add, or instruct the VU program to create and add (in either scenario, association module 30 will provide) at least two tables not previously known to one or more databases associated with VU 48. An example of one table provided under the present invention is shown in FIG. 3 and is referred to herein as an "association table 60". As depicted, association table 60 includes columns 62A-C that contain various UUIDs for advertisement(s) 56A-N (FIG. 2) shown in rows 64A-N. Specifically, column 62A contains foreign key asset UUIDs for the objects that contains the geometric information, textures, information tags, and any scripts for the corresponding advertisement(s) 56A-N shown in rows 64A-N. Column 62B contains advertisement UUIDs specifically assigned to corresponding assets. In general, advertisement(s) 56A-N are treated as invisible assets (referenced by visual reference(s) 54A-N in VU 48) that are tied to/associated with visible assets. Column 62C contains foreign key action UUIDs that reference associated actions record for the advertisement(s) 56A-N.

Another table provided under the present invention is action table 70 shown in FIG. 4 and is referred to herein as an "action table 70". In general, action table has columns 72A-F and rows 74A-N. As shown, column 74A contains action UUIDs that are unique keys for action shown in rows 74A-N. Column 72B contains action types for the corresponding actions (e.g., the launching of a uniform resource locator (URL), the displaying of text information, the playing of a multimedia object, the execution of a script, that setting of a timing specification (for a delay), the performance of a transaction, etc.). Column 72C contains action information for the corresponding actions (e.g., the URL, the text information, a pointer to the multimedia object, the script, the timing specification, the transaction data etc.). Column 72D contains action displays for the corresponding actions (e.g., a link description, a pointer to an icon object, etc.). Column 72E contains action next UUIDs for the corresponding actions. This allows multiple actions to be performed from a single invocation. Column 72F contains action next timings for executing such multiple actions (e.g., execute another action simultaneously with the "base" action, execute the additional action immediately following execution of the base action, execute the additional action after a certain time delay has occurred from execution of the base action.

It is understood that the advertisement table 60 and action table 70, as well as their corresponding descriptions, represent two possible arrangements of fields. Along these lines, it is understood that the data contained in advertisement table 60 and action table 70 could be arranged differently, added to, reduced, etc. In any event (referring back to FIGS. 1 and 2 collectively), once advertisement(s) 56A-N have been virtually associated with user(s) of VU 48, advertisement(s) 56A-N will be visually referenced in VU 48 by reference module 32. For example, the advertisement itself or some object corresponding to it will appear in VU 48 in conjunction with advertising avatars 50A-N. In addition, reference module 32 is configured to highlight or distinguish the such references in VU 48. For example, reference module 32 can be configured to distinguish the assets and/or avatars 50A-N with which advertisement(s) 56A-N are associated by providing a symbol, a glow, a textual display, an audio queue in VU 48, etc. Such distinguishing marks can be universal within VU 48 or, with additional fields, customized by advertisers. The distinguishing marks can also be dependent upon the action type, such as associating glowing blue around the texture for URLs, overlaying an icon of an ear for audio multimedia, overlaying an icon of a camera for video multimedia, inserting a clickable word "more . . . " for text information to display.

Regardless, invocation module 34 will invoke advertisement(s) 56A-N in VU 48 in response to a "trigger" occurring (e.g., by triggering user(s) 52A-N. That is, invocation module 34 is configured to register trigger events. The invocation can take the form of triggering user(s) clicking on reference(s) 54A-N (e.g., with pointing devices), hovering over reference(s) 54A-N (with the pointing devices), text chatting to/with advertising user(s), giving a voice command, or passively or actively triggering a condition. An example of a condition is the location of triggering avatar(s) 52A-N near the reference(s) within VU 48 to cause automatic invocation of advertisement(s) 56A-N a predetermined quantity of times separated by at least on predetermined time interval (e.g., every ten minutes).

Regardless, in response to advertisement(s) 56A-N being invoked, execution module 36 will execute, or cause to be executed, actions associated with the invoked advertisement(s) 56A-N as identified in action table 70. For example, if a URL was engaged, VU 48 can pass the URL to the triggering user(s)' client software, which can then each launch an external web browser to the URL or, if applicable, display the URL within an embedded web browser. This technique is known in the field of email, instant messaging, and other software, and often allows the user(s) to define where the URL will be launched, or to prohibit launching, or to prompt before launching.

If text information was engaged by triggering user(s), VU 48 can be caused by execution module 36 to display the text, such as via a chat message, a floating text message similar to a cartoon speaking balloon, a text message that appears on the advertisement(s)' textures (assuming it is of sufficient size). It can provide further commands such as a link to email the text, copy the text to the triggering user(s)' 52A-N clipboard(s), speak the text, or translate the text.

If multimedia object(s) was engaged, VU 48 can be caused by execution module 36 to run the associated multimedia within VU 48 (e.g., as an animated/audio asset), and/or instruct the user(s)' client(s) to download the multimedia object to the user(s)' client cache for playback in an embedded media player window or an external media player. As with the URLs, a typical embodiment will allow the user(s) to control aspects of this such as permission, where to play the multimedia, volume of the multimedia, dimensions of the multimedia, and any other characteristics of multimedia.

If script(s) were engaged, VU 48 executes the script(s) as it does any other VU script. If transaction(s) were engaged, VU 48 performs the transaction(s) from the advertiser(s)' agent to the user(s)' agent. For example, VU currency can be debited from the advertiser(s) account and credited to the user(s) account.

At each step above there can be a plurality of engagements based on the database fields, and multiple steps above can be engaged simultaneously, in an order, or in an order with delays. For example, there could be two URLs engaged that will launch separate browser windows or multiple tabs within a tab-enabled browser. As such, the following illustrative complex sequence of actions could transpire:

(1) A URL launches;
(2) A transaction to credit the user(s)' account with X number of VU currency units for allowing the URL to launch;
(3) A text box explaining that an audio clip will play, followed by a simple quiz, where upon completion the user will be credited with X VU currency units pending a click to close the text box;
(4) A three minute audio clip that plays;
(5) A script that: (a) text chats a question designed to determine whether the user listened to the audio clip, (b) accepts an answer via text chat, such as a letter or number corresponding to a multiple choice question, and (c) if answer was correct, proceeds to last action, or if incorrect, either cancels last action or displays a text message stating the answer was correct, along with a choice of whether to replay the audio clip. This demonstrates that scripts will be able to invoke specific action UUIDs; and
(6) A transaction to credit the user's account with X VU currency units.

It is understood that VU 48 will likely should implement user preference(s) to advertisement(s), such as whether to allow, what types to allow, how frequently to allow, etc. Similarly, VU 49 can apply filters, such as to prevent adult advertisement(s) to be available to user's who have registered as minors or who have not "proven" their status as an adult, such as through registering a credit card or signing up with a third party service that performs a similar function.

Regardless, compensation module 38 can cause advertising users to be compensated. This can be in any way now known or later developed. One example is that the advertising user(s) can be compensated on a "per click" per-click based on invocation of advertisement(s) 56A-N and/or execution of the corresponding action(s). Another example is that the advertising user(s) can be compensated just for allowing association with advertisements(s) 56A-N. Yet another is that the advertising user(s) can be compensated based on completion of transaction(s) between triggering user(s) and merchant(s) associated with advertisement(s) 56A-N. Regardless of the compensation method, such compensation can take any form such as the advertising user(s) being provided with credit(s) associated with VU 48, provided with compensation outside of VU 48 in the "real world" with compensation such as such as money, gift certificate(s), good(s) and/or service(s), etc.

While shown and described herein as a method and system for invoking advertisements in a VU, it is understood that the invention further provides various alternative embodiments. For example, in one embodiment, the invention provides a computer-readable/useable medium that includes computer program code to enable a computer infrastructure to invoke advertisements in a VU. To this extent, the computer-readable/useable medium includes program code that implements the process(es) of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 18 (FIG. 1) and/or storage system 26 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to invoke advertisements in a VU. In this case, the service provider can create, maintain, support, etc., a computer infrastructure, such as computer infrastructure 12 (FIG. 1) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for invoking advertisements in a VU. In this case, a computer infrastructure, such as computer infrastructure 12 (FIG. 1), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for invoking advertisements in a virtual universe (VU) via a computing device such that an advertiser can leverage information and a client base from the VU outside the VU, the method comprising:

virtually associating, via an association module, an advertisement with an advertising user of the VU;

referencing, via a reference module, the advertisement visually in the VU on an aspect of an advertising avatar of the advertising user that is displayed as part of the advertising avatar, the visually referenced advertisement displayed as part of the advertising avatar dependent on the advertiser;

distinguishing, via the reference module, the advertising avatar with which the referenced advertisement is associated using a distinguishing mark, the distinguishing mark providing a distinct visual reference for the advertising avatar that is:

distinct from the visually referenced advertisement displayed as part of the advertising avatar; and universal for all advertising avatars within the VU and independent from the advertisement;

invoking, via an invocation module, the advertisement in the VU in response to a trigger occurring in the VU, the trigger being an action by a triggering user that is different from the advertising user interacting with the advertising avatar and the trigger includes a triggering avatar of the triggering user being positioned a predetermined distance from the referenced advertisement within the VU to cause automatic invocation of the advertisement a predetermined quantity of times separated by at least a predetermined time interval; and teleporting, via an execution module, the triggering user to a location within the VU associated with the advertisement to provide further information regarding the advertisement in response to the invoking.

2. The method of claim 1, the action being associated with the advertisement executed in accordance with a set of instructions associated with the advertisement in a first table associated with the VU, the first table comprising:
 a first field containing a foreign key object universally unique identifier (UUID) for an object that contains geometric information, textures, information tags and any scripts for the advertisement;
 a second field containing a foreign key action UUID for an action record associated with the action; and
 a third field containing an advertisement UUID associated with the advertising user, wherein the advertisement UUID is associated with the foreign key object UUID and the foreign key action UUID.

3. The method of claim 2, further comprising a second table configured to define the execution of the action associated with the advertisement, the second table comprising:
 a first field containing an action UUID that comprises a unique key for the action associated with the advertisement;
 a second field containing an action type for the action associated with the advertisement;
 a third field containing action information for the action associated with the advertisement;
 a fourth field containing an action display for the action associated with the advertisement;
 a fifth field containing an action next UUID to allow for multiple actions associated with the advertisement; and
 a sixth field containing an action next timing for the action associated with the advertisement.

4. The method of claim 3, wherein:
 the action type comprising at least one of the following: launching a uniform resource locator (URL), displaying text information, playing a multimedia object, executing a script, setting a timing specification for a delay, and performing a transaction;
 the action information comprising at least one of the following: the URL, the text information, a pointer to the multimedia object, the script, the timing specification, and the transaction data;
 the action display comprising at least one of the following: a link description and a pointer to an icon object; and
 the action next timing setting forth a time to execute an additional action in response to the executing of the action associated with the advertisement.

5. The method of claim 1, further comprising compensating the advertising user, the compensating comprising at least one of the following: providing credits associated with the VU to the advertising user and providing a reward to the advertising user outside of the VU.

6. A system for invoking advertisements in a virtual universe (VU) such that an advertiser can leverage information and a client base from the VU outside the VU, the system comprising:
 at least one computer device, having:
  an association module for virtually associating an advertisement with an advertising user of the VU;
  a reference module for:
   referencing the advertisement visually in the VU on an aspect of an advertising avatar of the user that is displayed as part of the advertising avatar, the visually referenced advertisement displayed as part of the advertising avatar dependent on the advertiser; and
   distinguishing the advertising avatar with which the referenced advertisement is associated using a distinguishing mark, the distinguishing mark providing a distinct visual reference for the advertising avatar that is:
    distinct from the visually referenced advertisement displayed as part of the advertising avatar; and
    universal for all advertising avatars within the VU and independent from the advertisement;
  an invocation module for invoking the advertisement in the VU in response to a trigger occurring in the VU, the trigger being an action by a triggering user that is different from the advertising user interacting with the advertising avatar and the trigger includes a triggering avatar of the triggering user being positioned a predetermined distance from the referenced advertisement within the VU to cause automatic invocation of the advertisement a predetermined quantity of times separated by at least a predetermined time interval; and
  an execution module for teleporting the triggering user to a location within the VU associated with the advertisement to provide further information regarding the advertisement in response to the advertisement being invoked.

7. The system of claim 6, the action associated with the advertisement being executed in accordance with a set of instructions associated with the advertisement in a first table associated with the VU, the first table comprising:
 a first field containing a foreign key object universally unique identifier (UUID) for an object that contains geometric information, textures, information tags and any scripts for the advertisement;
 a second field containing a foreign key action UUID for an action record associated with the action; and
 a third field containing an advertisement UUID associated with the advertising user, wherein the advertisement UUID is associated with the foreign key object UUID and the foreign key action UUID.

8. The system of claim 7, further comprising a second table configured to define the execution of the action associated with the advertisement, the second table comprising:
 a first field containing an action UUID that comprises a unique key for the action associated with the advertisement;
 a second field containing an action type for the action associated with the advertisement;
 a third field containing action information for the action associated with the advertisement;
 a fourth field containing an action display for the action associated with the advertisement;
 a fifth field containing an action next UUID to allow for multiple actions associated with the advertisement; and
 a sixth field containing an action next timing for the action associated with the advertisement.

9. The system of claim 8, wherein:
 the action type comprising at least one of the following: a launching of a uniform resource locator (URL), a displaying of text information, a playing of a multimedia object, an execution of a script, a setting of a timing specification for a delay, and a performance of a transaction;

the action information comprising at least one of the following: the URL, the text information, a pointer to the multimedia object, the script, the timing specification, and the transaction data;

the action display comprising at least one of the following: a link description and a pointer to an icon object; and the action next timing setting forth a time to execute an additional action in response to execution of the action associated with the advertisement.

10. The system of claim 6, further comprising a module for compensating the advertising user with at least one of the following: a provision of credits associated with the VU to the advertising user and a provision of a reward to the advertising user outside of the VU.

11. A program product stored on a non-transitory computer readable storage medium for invoking advertisements in a virtual universe (VU) such that an advertiser can leverage information and a client base from the VU outside the VU, the computer readable medium comprising program code for causing a computer to:

visually associate, via an association module, an advertisement with an advertising user of the VU;

reference, via a reference module, the advertisement visually in the VU on an aspect of an advertising avatar of the advertising user that is displayed as part of the avatar, the visually referenced advertisement displayed as part of the advertising avatar dependent on the advertiser;

distinguish, via the reference module, the advertising avatar with which the referenced advertisement is associated using a distinguishing mark, the distinguishing mark providing a distinct visual reference for the advertising avatar that is:

distinct from the visually referenced advertisement displayed as part of the advertising avatar; and universal for all advertising avatars within the VU and independent from the advertisement;

invoke, via an invocation module, the advertisement in response to a trigger occurring in the VU, the trigger being an action by a triggering user that is different from the advertising user interacting with the advertising avatar and the trigger includes a triggering avatar of the triggering user being positioned a predetermined distance from the referenced advertisement within the VU to cause automatic invocation of the advertisement a predetermined quantity of times separated by at least a predetermined time interval; and teleport, via an execution module, the triggering user to a location within the VU associated with the advertisement to provide further information regarding the advertisement in response to the advertisement being invoked.

12. The program product of claim 11, the action associated with the advertisement being executed in accordance with a set of instructions associated with the advertisement in a first table associated with the VU, the first table comprising:

a first field containing a foreign key object universally unique identifier (UUID) for an object that contains geometric information, textures, information tags and any scripts for the advertisement;

a second field containing a foreign key action UUID for an action record associated with the action; and a third field containing an advertisement UUID associated with the advertising user, wherein the advertisement UUID is associated with the foreign key object UUID and the foreign key action UUID.

13. The program product of claim 12, further comprising a second table configured to define the execution of the action associated with the advertisement, the second table comprising:

a first field containing an action UUID that comprises a unique key for the action associated with the advertisement;

a second field containing an action type for the action associated with the advertisement;

a third field containing action information for the action associated with the advertisement;

a fourth field containing an action display for the action associated with the advertisement;

a fifth field containing an action next UUID to allow for multiple actions associated with the advertisement; and a sixth field containing an action next timing for the action associated with the advertisement.

14. The program product of claim 13, wherein:

the action type comprising at least one of the following: a launching of a uniform resource locator (URL), a displaying of text information, a playing of a multimedia object, an execution of a script, a setting of a timing specification for a delay, and a performance of a transaction;

the action information comprising at least one of the following: the URL, the text information, a pointer to the multimedia object, the script, the timing specification, and the transaction data;

the action display comprising at least one of the following: a link description and a pointer to an icon object; and the action next timing setting forth a time to execute an additional action in response to execution of the action associated with the advertisement.

15. The program product of claim 11, the program product further comprising program code for causing the computer system to compensate the advertising user by invoking at least one of the following: a provision of credits associated with the VU to the advertising user and a provision of a reward to the advertising user outside of the VU.

16. A method for deploying a system for invoking advertisements in a virtual universe (VU) such that an advertiser can leverage information and client base from the VU outside the VU, the method comprising:

providing a computer infrastructure being operable to:

visually associate, via an association module, an advertisement with an advertising user of the VU;

reference, via a reference module, the advertisement visually in the VU on an aspect of an advertising avatar of the advertising user that is displayed as part of the advertising avatar, the visually referenced advertisement displayed as part of the advertising avatar dependent on the advertiser;

distinguish, via the reference module, the advertising avatar with which the reference advertisement is associated using a distinguishing mark, the distinguishing mark providing a distinct visual reference for the advertising avatar that is:

distinct from the visually referenced advertisement displayed as part of the advertising avatar; and universal for all advertising avatars within the VU and independent from the advertisement;

invoke, via an invocation module, the advertisement in response to a trigger occurring in the VU, the trigger being an action by a triggering user that is different from the advertising user interacting with the advertising avatar and the trigger includes a triggering avatar of the triggering user being positioned a predetermined distance from the referenced advertisement within the VU to cause automatic invocation of the advertisement a predetermined quantity of times separated by at least a predetermined time interval; and teleport, via an execution module, the triggering user to a location within the VU associated with the advertisement to provide further information regarding the advertisement in response to the advertisement being invoked.

17. The method of claim 1, wherein the action associated with the advertisement further includes invoking a legacy browser space.

18. The method of claim 1, wherein executing the action associated with the advertisement is responsive to initiating a script including a question and the user successfully answering the question.

19. The method of claim 1, wherein executing the action associated with the advertisement includes either:
executing a first action and a second action simultaneously,
executing the second action immediately following the execution of the first action, or
executing the second action after a predetermined time delay has occurred from execution of the first action.

20. The method of claim 1, wherein the distinguishing mark includes a symbol.

21. The method of claim 3, wherein the distinguishing mark is dependent on the action type for the action associated with the advertisement.

22. The method of claim 1, wherein the distinguishing mark includes a glow surrounding the visually referenced advertisement.

23. The method of claim 1, wherein the distinguishing mark includes a glow surrounding the advertising avatar.

24. The method of claim 1, wherein the distinguishing mark includes a multimedia queue.

* * * * *